United States Patent
Deckoff

(10) Patent No.: US 8,290,843 B2
(45) Date of Patent: Oct. 16, 2012

(54) MANAGING AN INVESTMENT VEHICLE

(75) Inventor: Stephen H. Deckoff, Bedford, NY (US)

(73) Assignee: Black Diamond Capital Management, L. L. C., Greenwich, CT (US)

( * ) Notice: Subject to any disclaimer, the term of this patent is extended or adjusted under 35 U.S.C. 154(b) by 1 day.

(21) Appl. No.: 12/800,609

(22) Filed: May 18, 2010

(65) Prior Publication Data

US 2010/0306132 A1    Dec. 2, 2010

Related U.S. Application Data

(63) Continuation of application No. 11/628,529, filed as application No. PCT/US2005/020042 on Jun. 6, 2006, now Pat. No. 7,720,734.

(60) Provisional application No. 60/577,047, filed on Jun. 4, 2004.

(51) Int. Cl.
*G06Q 40/00* (2012.01)
(52) U.S. Cl. ............................................ 705/35; 705/37
(58) Field of Classification Search .................... 705/35, 705/37
See application file for complete search history.

(56) References Cited

U.S. PATENT DOCUMENTS

| | | | | |
|---|---|---|---|---|
| 5,126,936 A * | 6/1992 | Champion et al. | ........... | 705/36 R |
| 6,460,021 B1 * | 10/2002 | Kirksey | ........................... | 705/35 |
| 2002/0091605 A1 * | 7/2002 | Labe et al. | ....................... | 705/36 |
| 2003/0018563 A1 * | 1/2003 | Kilgour et al. | ................... | 705/37 |
| 2003/0208428 A1 | 11/2003 | Raynes | ....................... | 705/36 R |
| 2003/0208431 A1 | 11/2003 | Raynes | ....................... | 705/36 R |
| 2004/0143528 A1 * | 7/2004 | Spieler et al. | .................... | 705/35 |
| 2004/0158520 A1 * | 8/2004 | Noh | ................................ | 705/38 |
| 2005/0137957 A1 * | 6/2005 | McDaniel, Jr. | ................. | 705/37 |
| 2005/0187844 A1 * | 8/2005 | Chalermkraivuth et al. | ... | 705/36 |

OTHER PUBLICATIONS

Asset Purchase Agreement between Black Diamond USA Funding Corp., Black Diamond International Funding, Ltd., and others (Sep. 30, 1999).
Management Agreement between Black Diamond International Funding, Ltd., and Black Diamond Capital Management, L.L.C. (Sep. 30, 1999).
Collateral Administration Agreement between Black Diamond International Funding, Ltd., and Black Diamond Capital Management, L.L.C. (Sep. 30, 1999).
Re-Calculation Agreement between Black Diamond International Funding, Ltd., Black Diamond Capital Management, L.L.C., and Chase Bank of Texas N.A. (Sep. 30, 1999).
Amended and Restated Master Indenture between Black Diamond International Funding, Ltd., Black Diamond International Funding (Delaware), Inc., and JP Morgan Chase Bank, non-public draft (2004).

(Continued)

*Primary Examiner* — Jagdish Patel
(74) *Attorney, Agent, or Firm* — Donna L. Angotti; The Law Offices of Donna L. Angotti

(57) ABSTRACT

A method for managing an investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets is reevaluated, to ensure that the cash flows generated by the portfolio, disregarding fair market value of the assets, will be sufficient to pay timely principal and interest on the liabilities based on the evaluation criteria of two different rating agencies. In response to the reevaluating, the capital structure of the investment vehicle is adjusted to maintain a desired agency rating for the debt instruments.

21 Claims, 2 Drawing Sheets

OTHER PUBLICATIONS

Confidential Offering Memorandum of Black Diamond International Funding, Ltd. and Black Diamond International Funding (Delaware), Inc., non-public draft (2004).

Senior VFN Letter Agreement between Black Diamond International Funding, Ltd., Black Diamond International Funding (Delaware), Inc., and Black Diamond USA Funding Corp., non-public draft (2004).

Karen Brettell, Beantown Shop Plans Innovative Note for Money Market Investors, Derivatives Week, vol. XII, No. 30, pp. 1, 12 (Jul. 28, 2003).

Valerie C. Carlson, S&P gives two Texas pool funds triple-A's, The Bond Buyer, vol. 313, No. 29722, p. 13 (1) (Aug. 28, 1995).

Laurie S. Goodman and Frank J. Fabozzi, Managing a Portfolio of Collateralized Debt Obligations, Journal of Investing, Winter 2003, pp. 22-31 (perhaps published Dec. 22, 2003).

Nik Khakee and Elwyn Wong, CDO Transactions Structural Basics, The Securitization Conduti, vol. 5, No. 1, pp. 18-37 (2002).

Standard & Poor's, CDO Evaluator—A Valuable Resource for Analyzing CDO Transactions, www2.standardandpoors.com/spf/pdf/fixedincome/Final_CDOEvaluator_Slick.PDF (date unknown).

Standard & Poor's, CDO Evaluator Applies Correlation and Monte Carlo Simulation to the Art of Determining Portfolio Quality, http:www.standardandpoors.com/emarketing/structuredfinance/copyof111201_evaluator.html (Nov. 12, 2001).

File history U.S. Appl. No. 11/146,748, now US Patent 7,580,874.

File history U.S. Appl. No. 11/628,529, now US Patent 7,720,734.

File history PCT/US2005/20042, Particularly favorable International Preliminary Examination Report Nov. 2006.

\* cited by examiner

MANAGING AN INVESTMENT VEHICLE

RELATED APPLICATION DATA

This application is a continuation of U.S. application Ser. No. 11/628,529 filed Dec. 1, 2006, now U.S. Pat. No. 7,720,734 which is based on PCT/US2005/20042 filed Jun. 6, 2006, which claims benefit of provisional application 60/577,047 filed Jun. 4, 2004 which are incorporated herein by reference in their entirety.

BACKGROUND

This invention relates to the practice, administration, or management of an enterprise, or the processing of financial data.

Investment vehicles obtain investments from investors, and then invest the proceeds in assets that will generate cash flows. Some portion of the cash flows from the assets is then paid to the investors.

SUMMARY

In general, in a first aspect, the invention features a method for managing an investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets are reevaluated, to ensure that the cash flows generated by the portfolio, disregarding fair market value of the assets, will be sufficient to pay timely principal and interest on the liabilities based on evaluation criteria of two different rating agencies. In response to the reevaluating, the capital structure of the investment vehicle is adjusted to maintain a desired agency rating for the debt instruments.

In a second aspect, the invention features a method for managing an investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets are reevaluated, to ensure that the cash flows generated by the portfolio, disregarding fair market value of the assets, will be sufficient to pay timely principal and interest on the liabilities. In response to the reevaluating, the capital structure of the investment vehicle is adjusted to maintain a desired agency rating for the debt instruments.

In a third aspect, the invention features a method for managing an investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets are reevaluated, to ensure that the cash flows generated by the portfolio will be sufficient to pay timely principal and interest on the liabilities based on evaluation criteria of two different rating agencies. In response to the reevaluating, the capital structure of the investment vehicle is adjusted to maintain a desired agency rating for the debt instruments.

In a fourth aspect, the invention features method for investing. At least one debt instrument from an investment vehicle is purchased, and payment is received from the investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets are reevaluated, to ensure that the cash flows generated by the portfolio, disregarding fair market value of the assets, will be sufficient to pay timely principal and interest on the liabilities. In response to the reevaluating, the capital structure of the investment vehicle is adjusted to maintain a desired agency rating for the debt instruments.

In a fifth aspect, the invention features method for investing. At least one debt instrument from an investment vehicle is purchased, and payment is received from the investment vehicle. The investment vehicle issues multiple debt instruments to a plurality of investors. The debt instruments have different liability characteristics. The proceeds of the debt instruments are invested in assets. From time to time, liabilities on the debt instruments and the credit quality of the assets are reevaluated, to ensure that the cash flows generated by the portfolio will be sufficient to pay timely principal and interest on the liabilities based on evaluation criteria of two different rating agencies. In response to the reevaluating, the capital structure of the investment vehicle is adjusted to maintain a desired agency rating for the debt instruments.

Embodiments of the invention may include one or more of the following features. The reevaluating of liabilities may include calculating estimated default rates for the debt instruments, simulating default and interest rate scenarios, and/or determining a required capital structure for maintaining the desired agency rating. The debt instruments may differ from each other in maturity date, issue date, payment seniority, or agency rating. The debt instruments may be issued through a public offering or through a private placement, or a private placement to qualified investors. The reevaluation may be performed essentially each business day, on some other periodic, fixed, schedule, when a credit support aspect of the portfolio changes, when new debt instruments are issued or retired.

The above advantages and features are of representative embodiments only. It should be understood that they are not to be considered limitations on the invention as defined by the claims. Additional features and advantages of the invention will become apparent in the following description, from the drawings, and from the claims.

DESCRIPTION

I. Overview

Figure 1:
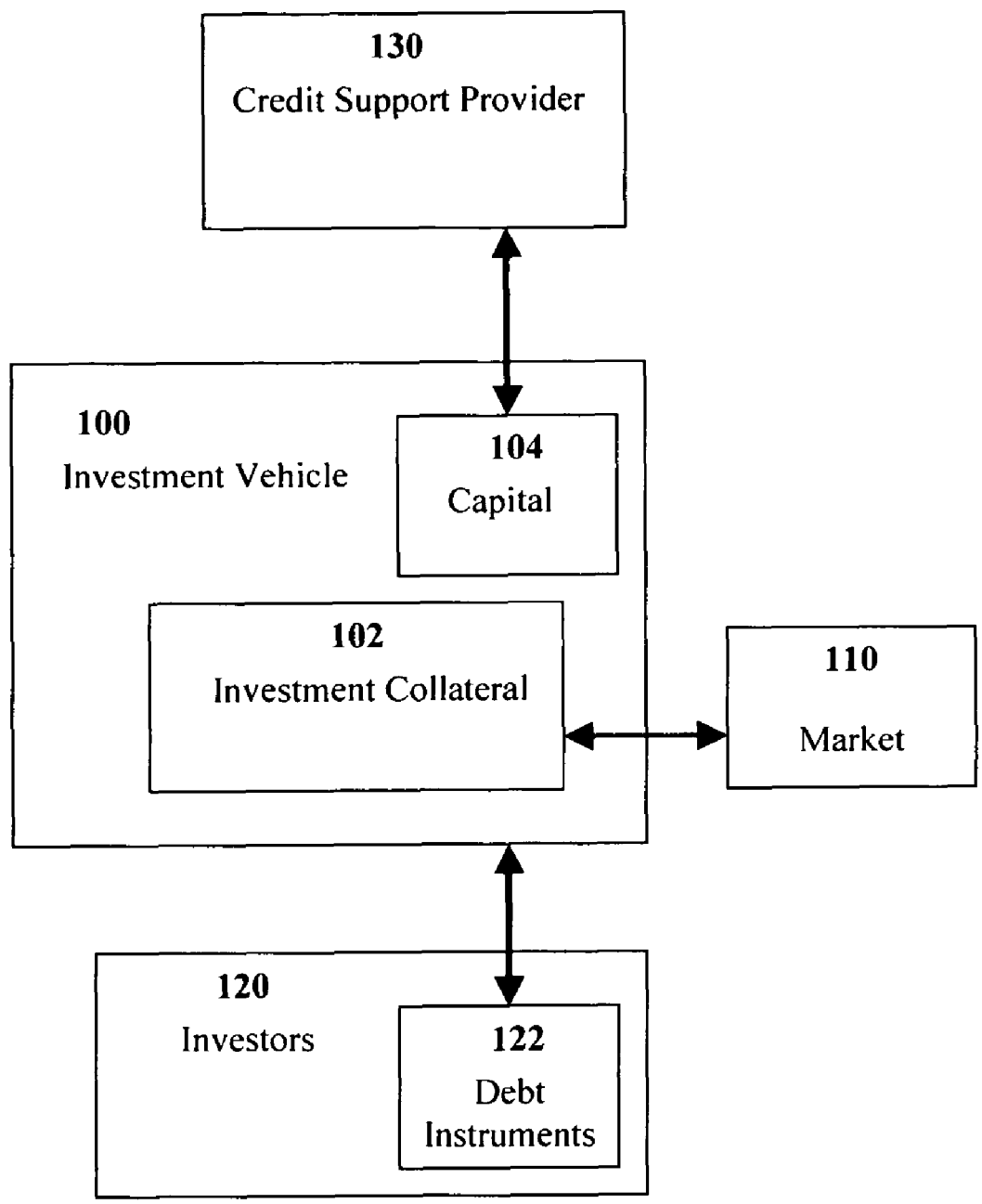
FIG. 1 is a schematic diagram of an investment vehicle.

Referring to FIG. 1, investment vehicle 100 may offer debt instruments 122 of one or more classes (e.g., in a public offering or by private placement) secured by a portfolio of collateral 102. Particularly in cases where the amounts due on debt instruments 122 fluctuates over time (because of rolling issue and retirement of debt instruments 122, currency fluctuations, differing amounts, etc.), the liabilities of investment vehicle 100 to repay debt instruments 122 may change over time. Similarly, the quality (including credit quality, among other features) of a given asset in portfolio 102 may change over time, and the assets in collateral portfolio 102 may change as investments are bought or sold out of portfolio 102 by the fund managers. Debt instruments 122 issued by investment vehicle 100 may be issued and retired, and assets in portfolio 102 may be purchased from and sold on market 110. Thus, the estimated default and loss risk of the entire transaction may change over time. To support a given rating from one of the credit rating agencies (Standard & Poor's, Moody's Investor Services or Fitch Ratings, Inc.) for one or more of debt instruments 122, investment vehicle 100 may analyze its portfolio 102 from time to time, for example daily, to assess capitalization 104 needed to maintain the desired rating. For example, a computer model of collateral portfolio 102 may determine a default ratio of portfolio 102, and that model may be run with a number of differing assumed scenarios. Using the result of that model under the scenarios, capitalization 104 of investment vehicle 100 may be managed to maintain a funding level, asset level, and/or asset credit quality to support a desired default profile and/or credit rating under all (or a selected fraction) of the assumed scenarios. In other alternatives, portfolio 102 may be managed so that the total portfolio 102 maintains the desired default profile or rating level.

Credit support provider or guarantor 130 may transfer capital 104 in and out of investment vehicle 100 as necessary to maintain the desired credit rating.

Investment vehicle 100 may be managed based on the cash flows generated by those assets and/or based on the fair market value of the assets. In an investment vehicle managed solely for the cash flows of the assets, the credit quality of an asset may be evaluated based on the cash flows generated by the asset. For example, the spread on a particular asset may change due to a macro event such as a terrorist attack, but the credit quality of the asset may not be affected, leaving its rating unaffected. Such an asset may be valuable collateral in a cash-flow managed investment vehicle, and less valuable in a investment vehicle managed based on fair market value. Generally, the cash flow of a given asset is less subject to rapid fluctuations than its fair market value.

This structure may be used in investment vehicle 100 that does not have a fixed capitalization structure. For example, investment vehicle 100 may offer debt instruments 122 to investors, and in turn invest the proceeds in securities 102. Investment vehicle 100 may require additional capital to be contributed as needed from credit support provider 130, in order to maintain a capitalization 104 or over-collateralization ratio that supports the desired rating for debt instruments 122. This allows the capitalization structure of investment vehicle 100 to be managed over time as investment vehicle 100's asset portfolio and liabilities change. This management may allow capital to be employed more efficiently, which may increase returns to investors.

Debt instruments 122 issued by investment vehicle 100 may vary from each other in a number of respects. For example, debt instruments 122 may be issued at different dates, bear differing maturities, or the cash flows may be tranched among debt instruments 122 at differing priorities. Debt instruments 122 may bear different interest rates, some of which may be fixed, while others may be floating, while others may have a step-up yield or other variable yield characteristic. Debt instruments 122 may be denominated in differing currencies. Investment vehicle 100 may adjust its capitalization 104 according to its portfolio makeup, which is dynamic. In some cases, investment vehicle 100 may issue a single class of debt instruments 122 to all investors.

The form of investment vehicle 100 may include a collateralized bond obligation, a collateralized debt obligation, a collateralized loan obligation, or other structured investment vehicle. Credit support provider 130 may be a sponsor of investment vehicle 100, a guarantor, or other source of capital.

II. Collateral and Capitalization

The investment fund may invest in securities as specified by the agreements between the investment vehicle 100 and its investors 120. Depending on any limits specified in agreements between investment vehicle 100, guarantor 130 and investors 120, investment vehicle 100 may invest in fixed income instruments (including, but not limited to, corporate loans and bonds, Government bonds, leases, Mortgage Backed Securities (MBS), Commercial Mortgages, Commercial Mortgage Backed Securities (cmbs), Asset backed securities (abs), Equipment Trust certificates (ETC, EETC), Collateralized Loan Obligations (CLO), Collateralized Debt Obligations (CDO), and default swaps), equities, real estate, derivatives, insurance contracts, or any other asset. These agreements may require investment vehicle 100 to maintain its funding level and capital at a certain level. That level may be stated, for example, as the portfolio balance+cash−liabilities, or as the ratio of that value to the portfolio balance.

As the credit quality of the assets in the portfolio changes, and as the liabilities on debt instruments 122 change, credit support provider or guarantor 130 may be required to contribute further capital so that investment vehicle 100 maintains a "safety margin," so that investment vehicle 100 as a whole can withstand a specified default profile or expected loss rate in order to maintain a specified credit rating. This safety margin may generally be set out in an indenture between investment vehicle 100, its investor 120 and credit support provider 130, and may be stated in terms of a computer model calculation based on default ratio or expected loss rates (see §III, below), and/or an over-collateralization ratio. Conversely, the credit quality of the assets and the liabilities on debt instruments 122 may change so that capital may be withdrawn from investment vehicle 100 while maintaining the safety margin required to meet the specified credit rating, allowing capital to be used more efficiently.

Generally, portfolio 102 may be managed so that the cash flows generated by portfolio collateral 102 will be aligned with the maturities of debt instruments 122.

Capital 104 may be supplied by the credit support provider 130 as equity, subordinated debt, a guarantee, or in other forms.

III. Computer Models and Analyses

In one implementation, the following four software components may be used to run a daily analysis of required capitalization:

Fund Manager: A database system, in this case called "Fund Manager," may maintain information on the collateral underlying portfolio 102. This database may be updated continually on a real time basis to track (a) the contents of the underlying collateral portfolio 102, and (b) the respective interest rates, maturities, amortization schedules, ratings, S&P Industry Sectors, portfolio break-down by asset type and the market price for each asset in portfolio 102.

CDO Evaluator: A financial model provided by Standard & Poor's (S&P) for the purpose of estimating the default risk of collateral portfolio 102 (securing a "collateralized debt obligation," or "CDO"), as it may be modified by S&P in connection with its confirmation of the ratings of debt instruments 122, and as may be further modified from time to time by S&P. The CDO evaluator is available to any client that contracts S&P to rate a product (see www.securitization.net/pdf/sp_cdo_111502.pdf). The CDO Evaluator calculates an SDR ("scenario default rate") for a specific portfolio of collateral 102. The SDR states the percent of default in portfolio 102 but does not calculate the timing of defaults or the loss severity associated with a default. The following components are used to evaluate varying timing and severity assumptions:

Dynamic Capital Optimizer (DCO): The DCO determines the required funding consistent with the desired rating for any class of debt instruments 122 for which investment vehicle 100 has a targeted rating (for example S&P "AAA" for the senior debt instruments, and lower ratings, or ratings by other agencies, for other debt instruments). The DCO may calculate and simulate different default and interest-rate trend scenarios using the SDR from the CDO evaluator and the Cash Flow Model, varying (i) the timing with which the defaults occur, (ii) the prepayment speed of the underlying collateral and (iii) interest rates. The DCO uses actual collateral portfolio 102 as of any point in time and the actual debt instruments 122 that exist on any day taking into account the terms of each debt instrument 122 outstanding. The DCO calls the Cash Flow Model (see next paragraph) iteratively in order to calculate the capital or required funding needed in order to pass each scenario. The highest required funding from any scenario becomes the required funding amount, which investment vehicle 100 is required to maintain on any given day in order to reduce any amortization of the transaction.

Cash Flow Model: A conventional cash flow model that generates the principal and interest cash flows from collateral portfolio 102, and applies the cash flows to the liabilities, both their principal and interest, in order to satisfy that the principal and interest on each debt instrument 122 will be paid on a timely basis when due.

Figure 2:
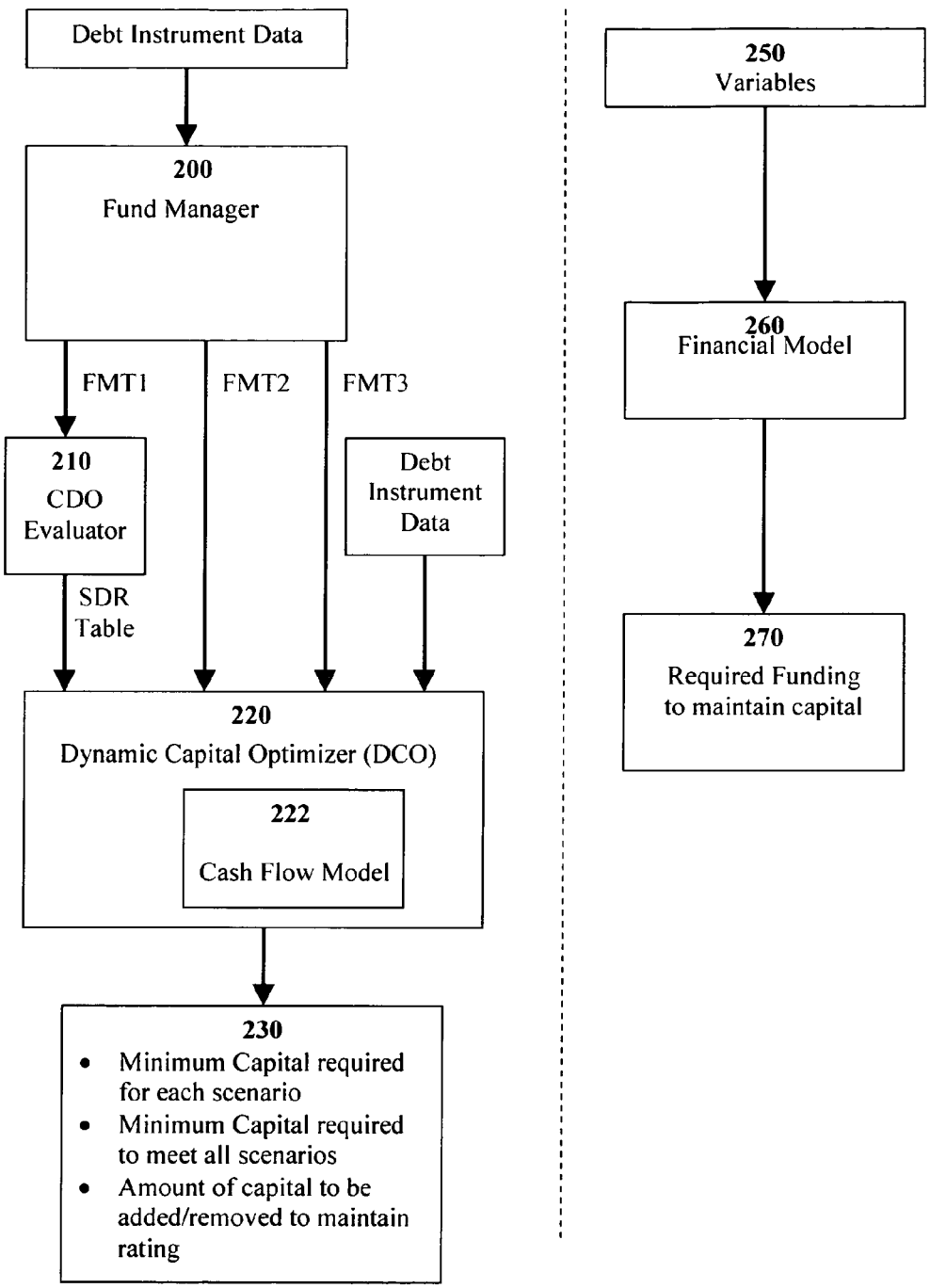
FIG. 2 is a flow chart of determining capital structure requirements.

As shown in FIG. 2, the required funding level may be calculated as follows:

Step 1—Run Fund Manager 200 in order to generate tables that describe collateral portfolio 102 and respective data for a specific day.

Inputs: Data in the database that includes descriptive information on the terms of each piece of collateral and daily trading information.

Outputs: (FMT1 ("Fund Manager Table")) Table that has every individual principal payment that contractually is required to be made as well as the Security, Rating, Industry, Timing associated with the payment.

(FMT2) Table that has aggregated principal payments going out over time for collateral portfolio 102 grouped into subportfolios based on whether the collateral is (i) fixed or floating rate; loans, bonds, Mortgage Backed Security, Asset Backed Security or synthetics; Secured or Unsecured; and Senior or Subordinated.

(FMT3) Table that has the total amounts in each subgrouping above as well as the percentage of the total collateral portfolio 102 and the respective weighted average interest rate.

Step 2—Run the S&P CDO Evaluator 210.

Inputs: FMT1

Process: S&P CDO Evaluator 210 performs the functions described above.

Outputs: Table of SDRs 212 for different rating levels going up to AAA

Step 3—Run DCO 220.

Inputs: (1) FMT2

(2) FMT3

(3) A table that specifically describes each debt instrument 122 currently outstanding or to be issued by the investment vehicle 100. For example, this table may describe the amount, coupon, maturity, amortization, and other attributes of each debt instrument 122. This table may be generated manually, and maintained as debt instruments 122 are issued or retired.

(4) The SDR generated in step 2 for the given rating being sought.

Process: DCO 220 evaluates a number of default scenarios and interest rate scenarios, for example twenty combinations, that assume different timing for defaults and different interest rate trends to the SDR calculated in Step 2. The default scenarios are described in paragraph [0025] below, and the interest rate scenarios are described in paragraph [0026].

Within each default-rate scenario combination, the DCO iteratively calls Cash Flow Model 222 to evaluate the level of capital required to pass the scenario. Each iteration applies Cash Flow Model 222 to the collateral portfolio, "Input Table (3)" from the above list (the descriptions of the debt instruments 122), and a given level of capitalization. One each iteration, Cash Flow Model 222 determines whether that level of capitalization passes the scenario. The iterative calls of Cash Flow Model 222 continue until the amount of capital required to pass the scenario has been determined within a specified tolerance.

After DCO 220 has finished all the required scenarios it then determines which needs the highest amount of capital. The maximum capital becomes the required amount. DCO 220 finishes by calculating how much capital can be taken out of investment vehicle 100, or how much has to be put in, to have optimal capitalization 104. Capital may be taken out as cash.

Outputs: Table 230 that has (a) the required capital for each scenario.

(b) the minimum required capital for investment vehicle 100 to pass all scenarios and thereby maintain the desired ratings. This minimum required capital is the maximum capital computed by the iterative application of the scenarios.

(c) the amount of capital that can be taken out of investment vehicle 100 by credit support provider 130 if there is too much capital or the amount of capital that must be put into investment vehicle 100 if there is too little capital.

Recall that the SDR ("scenario default rate") does not state the timing of defaults. Currently, to give an "AAA" rating, S&P supplies four default timing scenarios that make varying assumptions of this timing. S&P requires that these scenarios be applied to the SDR, and passed, in order to achieve the AAA rating. S&P's current example set of scenarios is as follows, though others may be applicable in other circumstances:

Default Patterns
Percent of SDR to be applied

|  | Scenario 1 | Scenario 2 | Scenario 3 | Scenario 4 |
| --- | --- | --- | --- | --- |
| Year 1 | 40% | 25% | 15% | 20% |
| Year 2 | 30% | 25% | 30% | 20% |
| Year 3 | 20% | 25% | 30% | 20% |
| Year 4 | 10% | 25% | 15% | 20% |
| Year 5 | 10% | 0% | 10% | 20% |

For example, scenario 1 assumes that 40% of all defaults that will occur over the entire life of the portfolio occur in year 1, 30% in year 2, 20% in year 3, etc. (Note that each scenario column sums to 100%.). In a fifth scenario (not supplied by S&P), there are 0% defaults and 0% prepayments in each year. This fifth scenario protects against liabilities on notes 122 that come due before cash flows mature from collateral 102.

Each of these Default patterns is tested with the portfolio and SDR four times, each time with a different LIBOR assumption. The four LIBOR vectors are—LIBOR Up, LIBOR Down, LIBOR Up/Down, LIBOR Forward. Hence there are altogether twenty (five default patterns×four LIBOR vectors) different scenarios that are tested.

In another implementation, investment vehicle 100 agrees with investors 120 to maintain a credit rating specified by a rating agency other than S&P, using a portfolio credit evaluation model 260 for rating collateral portfolio 102 specified by that agency. For example, the rating agency, or an investment bank, may have developed a function for a set of variables 250 (the values of which are based upon data from collateral portfolio 102) that determines a minimum level of capital 270 necessary to maintain a desired credit rating. For example, capitalization 270 may be a function 260 of the average rating of the individual assets in portfolio 102, diversity of those assets, weighted average life, weighted average recovery rate, average loss severity, and/or net margin. As another example, a rating agency may have developed a map of values from a set of variables 250 to a capitalization value, so that a "best fit" search of the map based on collateral portfolio 102 specifies the minimum level of capital 270. Once the minimum level of capital 270 is determined, capital may then be added or removed from investment vehicle 100 to meet the minimum capital requirements.

In yet another implementation, rating methods of two or more agencies may be combined to calculate the amount of required capital. For example, investment vehicle data may be processed through S&P CDO Evaluator 210 and DCO 220 to determine the capitalization necessary to maintain a desired S&P rating. Similarly, investment vehicle data may be processed through the financial model 260 of another rating agency to determine the capitalization necessary to for investment vehicle 100 to maintain a desired credit rating for that agency. Capitalization 104 of investment vehicle 100 may then be adjusted based on the higher of the two capitalization determinations.

For the convenience of the reader, the above description has focused on representative samples of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

The invention claimed is:

1. A method for investing, comprising the steps of:
   purchasing at least one debt instrument from an investment vehicle;
   participating in the investment of the proceeds of multiple debt instruments in assets having associated credit qualities, the debt instruments being issued from the investment vehicle to a plurality of investors and having different liability characteristics;
   prompting the periodic calculating in a non-transitory memory of a computer of a reevaluation of the liabilities on the debt instruments and the credit quality of the assets, to ensure that cash flows generated by the assets, disregarding fair market value of the assets, will be sufficient to pay timely principal and interest on the liabilities; and
   in response to the reevaluation, prompting the calculating in a non-transitory memory of a computer, an adjustment of a capital structure of the investment vehicle to maintain a desired agency rating for the debt instruments; and
   receiving a payment from the investment vehicle.

2. The method of claim 1, wherein reevaluating liabilities further comprises the steps of:
   calculating estimated default rates for the debt instruments;
   simulating default and interest-rate scenarios; and
   determining a required capital structure for maintaining the desired agency rating.

3. The method of claim 1, wherein the debt instruments are issued through a public offering.

4. The method of claim 1, wherein the debt instruments are issued through a private placement.

5. The method of claim 4, wherein the debt instruments are issued through a private placement to qualified investors.

6. The method of claim 1, wherein the reevaluation occurs on a periodic, fixed schedule.

7. The method of claim 6, wherein the periodic reevaluation is performed essentially each business day.

8. The method of claim 1, wherein the reevaluation is performed when new debt instruments are issued.

9. The method of claim 1, wherein the reevaluation is performed when debt instruments are retired.

10. The method of claim 1, wherein the reevaluating of the liabilities is based on evaluation criteria of two different rating agencies.

11. A method for investing, comprising the steps of:
    purchasing at least one debt instrument from an investment vehicle;
    participating in the investment of the proceeds of multiple debt instruments in assets having associated credit qualities, the debt instruments being issued from the investment vehicle to a plurality of investors and having different liability characteristics;

prompting the periodic calculating in a non-transitory memory of a computer of a reevaluation of the liabilities on the debt instruments and the credit quality of the assets, to ensure that cash flows generated by the assets will be sufficient to pay timely principal and interest on the liabilities based on evaluation criteria of two different rating agencies; and in response to the reevaluation, prompting the calculating in a non-transitory memory of a computer, an adjustment of a capital structure of the investment vehicle to maintain desired agency ratings for the debt instruments; and receiving a payment from the investment vehicle.

12. The method of claim 11, wherein reevaluating liabilities further comprises the steps of:
    calculating estimated default rates for the debt instruments;
    simulating default and interest-rate scenarios; and
    determining a required capital structure for maintaining the desired agency rating.

13. The method of claim 11, wherein the debt instruments differ from each other in maturity date.

14. The method of claim 11, wherein the debt instruments differ from each other in issue date.

15. The method of claim 11, wherein the debt instruments differ from each other in payment seniority.

16. The method of claim 11, wherein the debt instruments differ from each other in agency rating.

17. The method of claim 11, wherein the reevaluation occurs on a periodic, fixed schedule.

18. The method of claim 17, wherein the periodic reevaluation is performed essentially each business day.

19. The method of claim 11, wherein the reevaluation is performed when a credit support aspect of the assets changes.

20. The method of claim 11, wherein the reevaluation is performed when new debt instruments are issued.

21. The method of claim 11, wherein the reevaluating of the liabilities disregards fair market value of the assets.

* * * * *